US009239023B2

(12) United States Patent
Sasaki

(10) Patent No.: US 9,239,023 B2
(45) Date of Patent: Jan. 19, 2016

(54) STRADDLE TYPE VEHICLE

(71) Applicant: YAMAHA HATSUDOKI KABUSHIKI KAISHA, Shizuoka (JP)

(72) Inventor: Yuta Sasaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 263 days.

(21) Appl. No.: 13/689,065

(22) Filed: Nov. 29, 2012

(65) Prior Publication Data
US 2014/0032077 A1 Jan. 30, 2014

(30) Foreign Application Priority Data

Jul. 24, 2012 (JP) ................. 2012-163676

(51) Int. Cl.
F02D 41/00 (2006.01)
B60W 30/14 (2006.01)
B62K 23/04 (2006.01)
F02D 11/02 (2006.01)
F02D 11/10 (2006.01)
F02B 61/02 (2006.01)
F02D 9/10 (2006.01)

(52) U.S. Cl.
CPC .......... F02D 41/0002 (2013.01); B60W 30/14 (2013.01); B62K 23/04 (2013.01); F02D 11/02 (2013.01); F02D 11/106 (2013.01); F02B 61/02 (2013.01); F02D 9/1095 (2013.01)

(58) Field of Classification Search
CPC .. B62K 11/14; Y10T 74/20396; B60K 26/02; B60W 2710/0644; B60W 2720/10; B60W 30/143; B63H 20/00; B63H 20/12; B63H 21/213; F02B 75/22

USPC ............... 701/42, 93; 180/335; 123/399, 519, 123/579; 74/485, 512; 440/84; 720/604; 296/180.1
See application file for complete search history.

(56) References Cited

U.S. PATENT DOCUMENTS

| 4,611,561 | A | 9/1986 | Suyama | |
| 2003/0047372 | A1* | 3/2003 | Fechner | B62K 11/14 180/335 |
| 2003/0075148 | A1* | 4/2003 | Hirakata | F02D 11/106 123/399 |
| 2003/0172763 | A1* | 9/2003 | Samoto | B62K 11/14 74/485 |
| 2005/0145057 | A1* | 7/2005 | Fujiwara | B60T 7/042 74/512 |
| 2006/0005808 | A1 | 1/2006 | Blomenberg et al. | |
| 2007/0084440 | A1 | 4/2007 | Hotta et al. | |
| 2007/0084658 | A1 | 4/2007 | Yamazaki et al. | |
| 2007/0243777 | A1* | 10/2007 | Hasegawa | B63H 20/00 440/84 |

(Continued)

FOREIGN PATENT DOCUMENTS

CN 101309812 B 6/2011
EP 1 777 395 A1 4/2007

(Continued)

Primary Examiner — James Trammell
Assistant Examiner — Sanjeev Malhotra
(74) Attorney, Agent, or Firm — Rabin & Berdo, P.C.

(57) ABSTRACT

The opening control mechanism includes a frame, a support shaft, a first pulley, a second pulley, a first elastic member and a second elastic member. A position taken by the second pulley when no force acts on the grip is referred to as a second reference position. The second pulley can be rotated in a second direction of rotation, starting from the second reference position. A processing unit performs a specified operation when the second pulley has been rotated in the second direction of rotation, starting from the second reference position, by a predetermined amount.

14 Claims, 9 Drawing Sheets

(56) References Cited

U.S. PATENT DOCUMENTS

| | | | |
|---|---|---|---|
| 2008/0178840 A1 | 7/2008 | Oshima et al. | |
| 2008/0257308 A1* | 10/2008 | Itagaki | F02D 9/1065 123/399 |
| 2009/0173562 A1 | 7/2009 | Namari et al. | |
| 2009/0228907 A1* | 9/2009 | Suzuki | G11B 17/051 720/604 |
| 2009/0240399 A1* | 9/2009 | Dagenais | B60T 8/1706 701/42 |
| 2009/0241913 A1* | 10/2009 | Yamagishi | F02M 25/0872 123/519 |
| 2009/0241923 A1* | 10/2009 | Yamagishi | F02M 37/007 123/579 |
| 2010/0082214 A1* | 4/2010 | Araki | B60W 30/143 701/93 |
| 2010/0268431 A1 | 10/2010 | Itagaki | |
| 2014/0084623 A1* | 3/2014 | Miyamoto | B62J 17/00 296/180.1 |

FOREIGN PATENT DOCUMENTS

| | | |
|---|---|---|
| EP | 1 777 150 B1 | 7/2010 |
| EP | 2 241 498 A1 | 10/2010 |
| JP | 8-4561 | 1/1996 |
| JP | 2002-285869 | 10/2002 |
| JP | 2007-113416 A | 5/2007 |
| JP | 2007-198355 | 8/2007 |
| JP | 2008-184950 A | 8/2008 |
| JP | 2010-077889 A | 4/2010 |
| JP | 2010-247681 A | 11/2010 |

* cited by examiner

STRADDLE TYPE VEHICLE

CROSS-REFERENCE TO RELATED APPLICATION

This application is based on, and claims priority to, Japanese Patent Application No. 2012-163676, filed on Jul. 24, 2012 the contents of which are incorporated herein by reference.

BACKGROUND

1. Technical Field

The present invention relates to straddle type vehicles and, more particularly, to a straddle type vehicle including a system for performing a specified operation in response to rotation of a grip, starting from a free position, in the direction opposite that in which the grip is rotated to accelerate the vehicle.

2. Description of the Background Art

Motorcycles, a type of straddle type vehicles, are known. Some motorcycles provide an auto-cruise mode. As used herein, auto-cruise mode means the mode in which a travel speed is automatically maintained regardless of the grip operation by the rider. Typically, the auto-cruise mode reduces operational burdens on the rider and reduces fuel consumption compared with the normal travel mode in which the rider rotates the grip to control the travel speed.

Since the travel speed is maintained at a certain level in auto-cruise mode, the auto-cruise mode must be cancelled in order to accelerate or decelerate the motorcycle. The rider can cancel the auto-cruise mode by actuating a switch provided on the handlebars, for example. The rider must actuate a switch to cancel the auto-cruise mode. Since actuating a switch is an operation different from the operations to decelerate or accelerate the motorcycle in normal mode, the rider has some difficulty cancelling the auto-cruise mode in a motorcycle with a switch used to cancel the auto-cruise mode.

A motorcycle described in JP 2010-247681 A includes an arrangement that allows the operator to cancel the auto-cruise mode with a simple operation. In the motorcycle of JP 2010-247681 A, the auto-cruise mode can be cancelled by rotating the grip, starting from the free position, in a direction that causes the motorcycle to be decelerated. As used herein, free position means the position of the grip where no force acts on the grip.

In the motorcycle of JP 2010-247681 A, rotating the grip causes the accelerator pulley to rotate together with the rotated grip. In the motorcycle of JP 2010-247681 A, rotation of the accelerator pulley is detected by a sensor to cancel the auto-cruise mode.

SUMMARY

In the motorcycle of JP 2010-247681 A, the auto-cruise mode may be cancelled by rotating the grip, meaning simpler operations. However, in the motorcycle of JP 2010-247681 A, the grip is rotated, starting from the free position, in a direction that causes the motorcycle to be decelerated and thus rotates the accelerator pulley, meaning that the accelerator pulley provided in the motorcycle of JP 2010-247681 A requires not only a range of rotation for accelerating and decelerating the motorcycle but also a range of rotation for cancelling the auto-cruise mode. In the motorcycle of JP 2010-247681 A, rotation of the grip may cause the accelerator pulley to rotationally move the position that causes the auto-cruise mode to be cancelled and the position that causes the motorcycle to be accelerated to the maximum rate. Thus, in the motorcycle of JP 2010-247681 A, the accelerator pulley may rotationally move in a greater range than an accelerator pulley used in a motorcycle without the auto-cruise mode. Accordingly, the motorcycle of JP 2010-247681 A requires a large space depending on the angle in which the accelerator pulley may be rotated, resulting in a larger device as a whole. The motorcycle of JP 2010-247681 A involves a large range of rotational movement of the accelerator pulley, requiring a larger range of rotation of the grip or the like. An accelerator pulley with a large diameter may be used such that even a small angle of rotation may cause the pulley to move significantly. However, such implementations with an accelerator pulley with a large diameter result in a larger device as a whole.

An object of the present invention is to avoid the use of a large cancelling device in a straddle type vehicle including an arrangement that allows the operator to perform a specified operation with a simple operation.

Embodiments of the present invention include a straddle type vehicle. The vehicle includes a handlebar, a grip attached to the handlebar, an engine, an intake passage connected with the engine and a throttle body, including a throttle valve, provided on the intake passage. The vehicle further includes a drive pulley configured to be rotated as the grip is rotated. The vehicle also has a first throttle cable and a second throttle cable located between the drive pulley and the throttle valve. A processing unit is configured to perform a specified operation or issue an instruction in response to an operation of the grip. An opening control mechanism is configured to control a degree of opening of the throttle valve. The opening control mechanism includes a frame, a support shaft supported by the frame and rotatable in a first direction of rotation starting from a first reference position, a first pulley attached to the support shaft, the first pulley being non-rotatable relative to the support shaft, and the first throttle cable being connected with the first pulley, a second pulley attached to the support shaft, the second throttle cable being connected with the second pulley, and a first elastic member located between the frame and the first pulley.

When the grip is rotated in a third direction of rotation, a force is transmitted from the first throttle cable to the first pulley such that the first pulley is rotated in the first direction of rotation to move the support shaft from the first reference position in the first direction of rotation. The processing unit issues the instruction, which opens the throttle valve, as the support shaft is rotated in the first direction of rotation from the first reference position. With the support shaft being positioned at a position forward in the first direction of rotation relative to the first reference position, the first elastic member causes a force in a second direction of rotation, which is opposite the first direction of rotation, to act on the first pulley. A position taken by the second pulley, when no force acts on the grip, is referred to as a second reference position, and the second pulley is rotatable in the second direction of rotation starting from the second reference position. When the grip is rotated in a fourth direction of rotation, which is opposite the third direction of rotation, a force is transmitted from the second throttle cable to the second pulley such that the second pulley is rotated in the second direction of rotation. The processing unit performs the specified operation when the second pulley has been rotated by a predetermined amount in the second direction of rotation starting from the second reference position.

In the straddle type vehicle above, the first throttle cable is connected with the first pulley, and the second throttle cable is connected with the second pulley. The first pulley that is rotated to accelerate the straddle type vehicle and the second pulley that is rotated to perform a specified operation are separate members. Thus, the range of rotational movement of each pulley is smaller than in an arrangement with a single pulley. The straddle type vehicle above does not require a space for a single pulley with a large range of rotational movement, avoiding the use of a large cancelling device, as is the case with a single pulley. Since the straddle type vehicle above uses two pulleys, the diameter of each pulley does not have to be large, reducing the size of the cancelling device compared with an arrangement with a single pulley with a large diameter.

DESCRIPTION OF THE EMBODIMENTS

Figure 1:
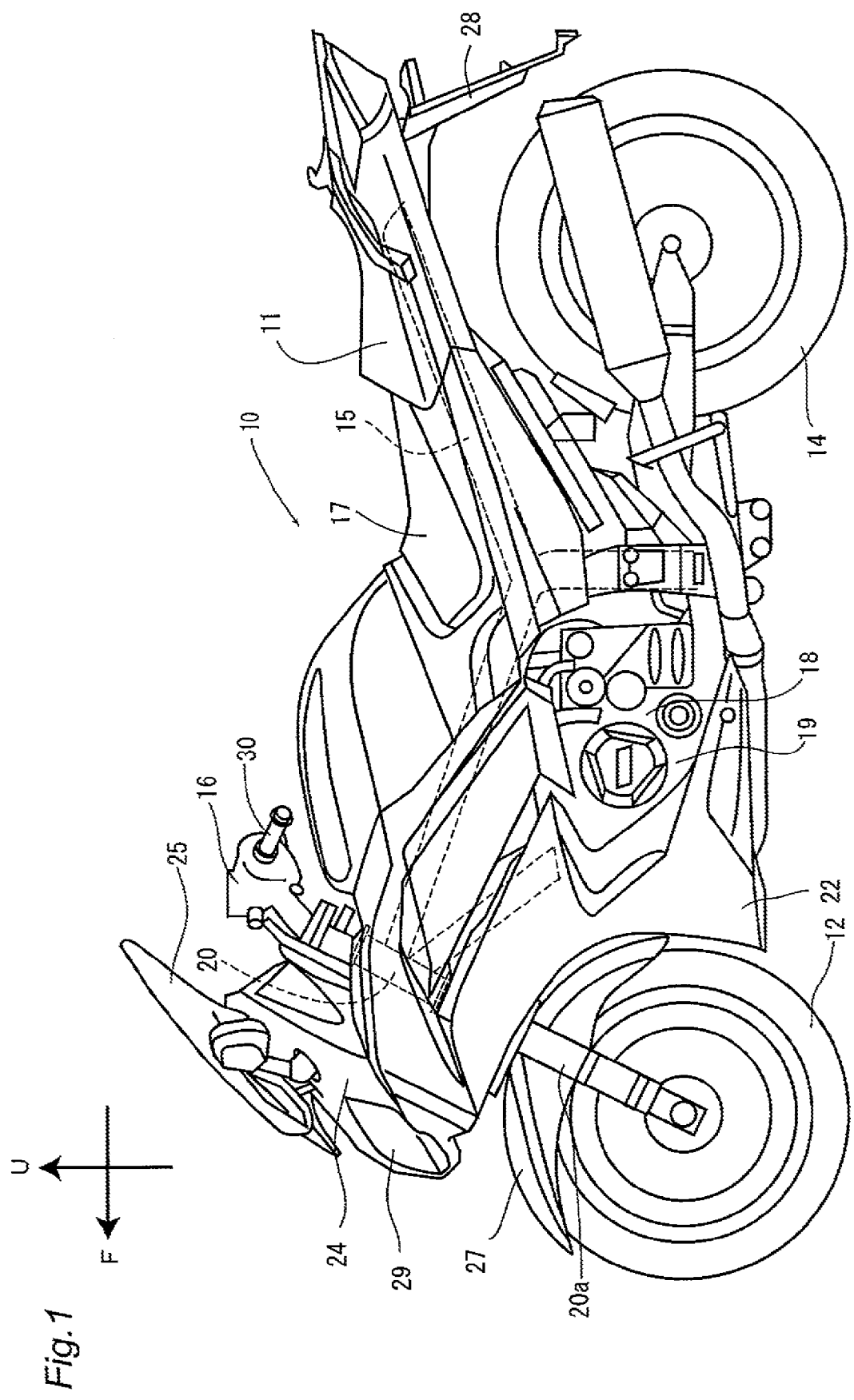
FIG. 1 is a schematic side view of an entire straddle type vehicle according to the present invention.

In a motorcycle that provides an auto-cruise mode, in order to decelerate or accelerate the vehicle when in auto-cruise mode, the auto-cruise mode must be cancelled. For example, the rider can actuate a switch provided on the handlebars or the like, for example, to cancel the auto-cruise mode. In a motorcycle with such an arrangement, a switch must be actuated to cancel the auto-cruise mode such that the rider has some difficulty cancelling the auto-cruise mode.

A motorcycle including an arrangement that allows the operator to cancel the auto-cruise mode with a simple operation has been proposed where the grip is rotated, starting from the free position, in a direction that causes the motorcycle to be decelerated, to cancel the auto-cruise mode.

In a motorcycle with such an arrangement, the grip may be rotated to rotate the accelerator pulley together with the rotated grip. Rotation of the accelerator pulley is detected by a sensor and the auto-cruise mode is cancelled.

However, in the above arrangement, the grip must be rotated, starting from the free position, in a direction that causes the motorcycle to be decelerated and thus rotates the accelerator pulley. An accelerator pulley with the above arrangement requires not only a rotation range for accelerating and decelerating the motorcycle but also a rotation range for cancelling the auto-cruise mode, meaning a large rotation range. In the motorcycle with the above arrangement, rotation of the grip may cause the accelerator pulley to rotationally move between the position that causes the auto-cruise mode to be cancelled and the position that causes the motorcycle to be accelerated to the maximum rate. Thus, an accelerator pulley with the above arrangement may rotationally move in a greater range than an accelerator pulley used in a motorcycle without the auto-cruise mode. The above arrangement requires a large rotation range of the accelerator pulley and thus a large space, potentially resulting in a larger device as a whole. The above arrangement involves a large range of rotational movement of the accelerator pulley, requiring a larger angular range in which the grip or the like can be rotated. An accelerator pulley with a large diameter may be used such that even a small angle of rotation may cause the pulley to move significantly. However, such implementations with an accelerator pulley with a large diameter result in a larger device as a whole.

In view of the above, the inventors of the present application came up with an arrangement that allows the operator to perform a specified operation with a simple operation and uses two pulleys to avoid the use of a large device. The inventors employed an arrangement that allows the operator to perform a specified operation by rotating the grip, starting from a reference position, in a direction that causes the straddle type vehicle to be decelerated. The specified operation may be the cancelling of the auto-cruise mode, for example. In such an implementation, the arrangement contemplated by the inventors allows the operator to cancel the auto-cruise mode in a simple manner. The inventors employed an arrangement where two different throttle cables are attached to the two pulleys, one pulley being driven to cause the straddle type vehicle to be accelerated and the other pulley being driven to perform a specified operation.

In the arrangement of the present invention, the pulley driven to cause the straddle type vehicle to be accelerated and the pulley driven by an operation to perform a specified operation are separate components, thereby reducing the range of rotational movement of each pulley compared with an arrangement with a single pulley. A straddle type vehicle contemplated by the inventors of the present application does not require a space for a single pulley with a large range of rotational movement, avoiding the use of a large cancelling device, as would be the case with an arrangement with a single pulley. For example, in an arrangement with a single large pulley, the large diameter of the pulley means that one end of the throttle cable is attached to a location that is far from that of the other end of the cable. Thus, in such an arrangement, the space for the pulley is large in diameter of the pulley, requiring a large space for the throttle cable. Thus, such an arrangement means a large device as a whole. A straddle type vehicle with the arrangement contemplated by the inventors uses two pulleys such that the diameter of each pulley does not have to be large, removing the necessity for a large space for the throttle cable. Thus, the arrangement contemplated by the inventors provides a device that is smaller as a whole than an arrangement with one pulley with a large diameter.

Now, a motorcycle 10, a type of the straddle type vehicle according to an embodiment of the present invention will be described with reference to the drawings. The same or corresponding elements throughout the drawings are labeled with the same numerals, and their description will not be repeated. Arrow "F" in the drawings indicates the forward direction with respect to the motorcycle 10; arrow "U" in the drawings indicates the upward direction with respect to the motorcycle 10; arrow "R" in the drawings indicates the right direction with respect to the motorcycle 10; and arrow "L" in the drawings indicates the left direction with respect to the motorcycle 10.

<Overall Arrangement>

FIG. 1 is a side view of an entire motorcycle 10 according to the present invention. In the following description, the directions "front/forward", "rear(ward)", "left" and "right" mean directions as perceived by a rider sitting on the seat of the motorcycle 10. "Outward in a vehicle width direction"

means the direction from the center of the vehicle in a vehicle width direction toward the right or left. "Inward in a vehicle width direction" means the direction toward the center of the vehicle in a vehicle width direction.

A motorcycle 10 includes a vehicle body 11, a front wheel 12 provided at the front of the motorcycle 10, and a rear wheel 14 provided at the rear of the motorcycle 10.

The vehicle body 11 generally includes a vehicle body frame 15, handlebars 16, a seat 17 and an engine 19.

The body frame 15 supports the engine 19, the seat 17 and other components. In FIG. 1, the body frame 15 is indicated by broken lines. The body frame 15 includes a head pipe 20. A steering shaft, not shown, is rotatably inserted into the head pipe 20. The handlebars 16 are attached to the upper end of the steering shaft. A front fork 20a is attached to the lower end of the steering shaft via a bracket, not shown. The front wheel 12 is rotatably attached to the bottom end of the front fork 20a.

The body frame 15 is covered with the body cover 22. The body cover 22 is made of resin. The body cover 22 includes a front cover 24, a front fender 27 and a rear fender 28.

The front cover 24 is located forward of the handlebars 16. The front cover 24 covers a front portion of the head pipe 20. A headlight 29 is located on the front cover 24. A wind screen 25 is located above the front cover 24.

The front fender 27 is located above the front wheel 12. The front fender 27 is located below the front cover 24. The front fender 27 projects forward from the front cover 24. The rear fender 28 is located above the rear wheel 14.

The handlebars 16 are located forward of the seat 17. The handlebars 16 extend to the left and right. A grip 30 that can be grasped by the rider is located on each end of the handlebars 16.

The seat 17 is located above the engine 19. The engine 19 is located forward of the rear wheel 14.

Figure 2:
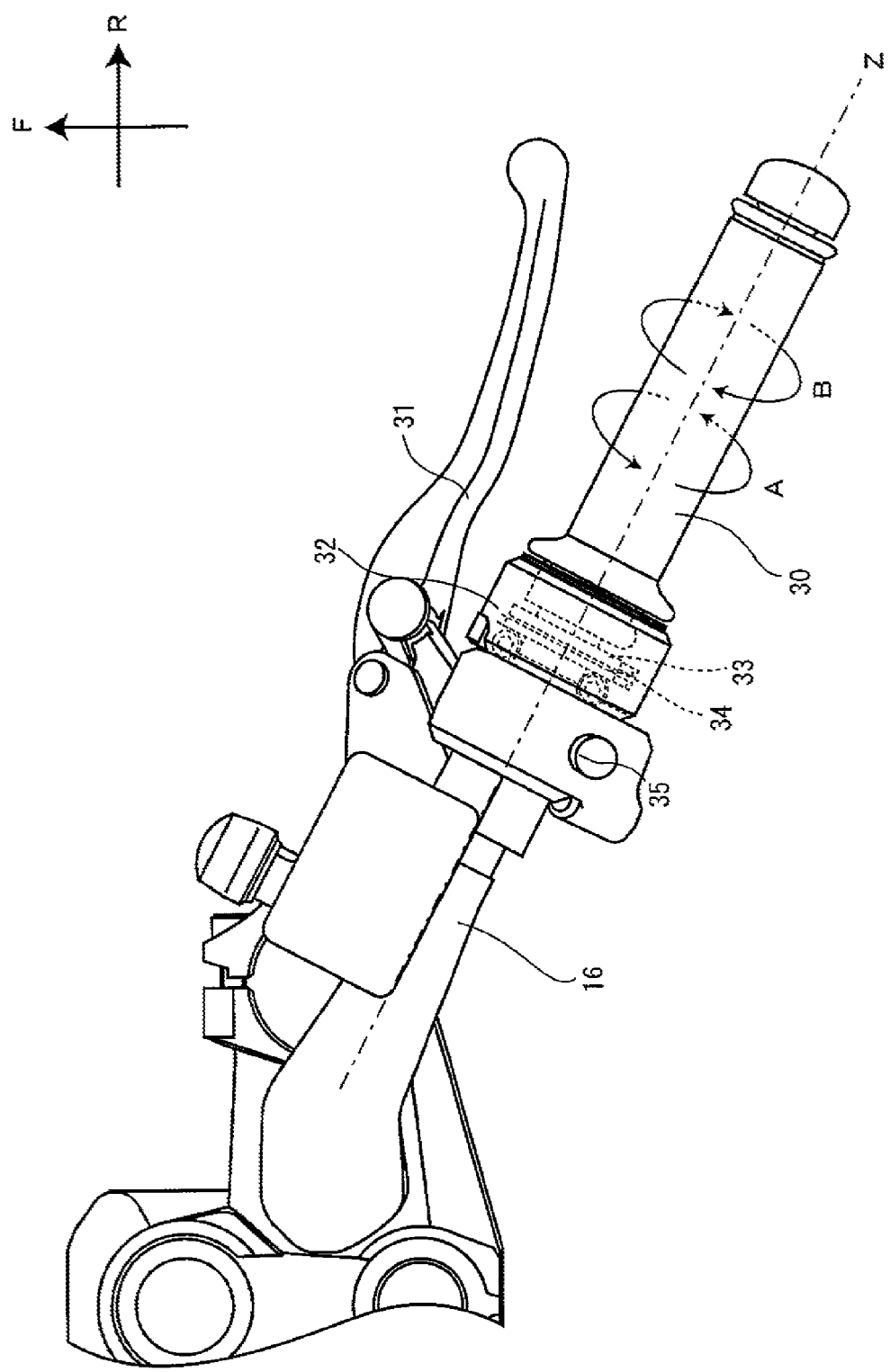
FIG. 2 is s partial enlarged view of the grip and its surrounding components.

FIG. 2 is a partial enlarged plan view of the grip 30 and its surrounding components. The grip 30 is attached to the handlebars 16. The grip 30 is rotatable relative to the handlebars 16. The grip 30 is rotatable around the axis of rotation Z. The handlebars 16 extend outward from the center of the vehicle in a vehicle width direction. A brake bar 31 is located forward of the grip 30. A pulley case 32 is located toward the center of the vehicle in a vehicle width direction relative to the grip 30. A drive pulley 33 is located inside the pulley case 32. The drive pulley 33 is attached to the handlebars 16. The drive pulley 33 is rotatable relative to the handlebars 16. A throttle cable 34 is attached to the drive pulley 33. The throttle cable 34 is wound around the drive pulley 33.

The grip 30 can be rotated toward the rear relative to the handlebars 16, i.e. in the direction of arrow A in FIG. 2 (corresponding to the third direction of rotation of the present invention). The third direction of rotation may also be referred to as an opening direction that causes the degree of opening of the throttle valve to increase. The position of the grip taken when no operating force by the rider acts on the grip 30 will be referred to as free position. When the grip 30 is rotated toward the rear, starting from the free position, relative to the handlebars 16, the vehicle speed of the motorcycle 10 increases. An auto-cruise switch 35 is provided toward the center of the vehicle in a vehicle width direction relative to the grip 30. When the auto-cruise switch 35 is depressed, the motorcycle 10 switches from normal mode to auto-cruise mode. As used herein, auto-cruise mode means the mode in which a certain travel speed is automatically maintained regardless of the grip operation by the rider. Normal mode means the mode in which the vehicle is ready to switch to auto-cruise mode upon depression of the auto-cruise switch 35. The grip 30 can be rotated toward the front relative to the handlebars 16, i.e. in the direction of arrow B in FIG. 2 (corresponding to the fourth direction of rotation of the present invention), starting from the free position. The fourth direction of rotation may also be referred to as a closing direction that causes the degree of opening of the throttle valve to decrease. When the grip 30 is rotated toward the front, starting from the free position, the auto-cruise mode is cancelled and the vehicle switches back to normal mode. The operations of this process will be discussed below in detail.

Figure 3:
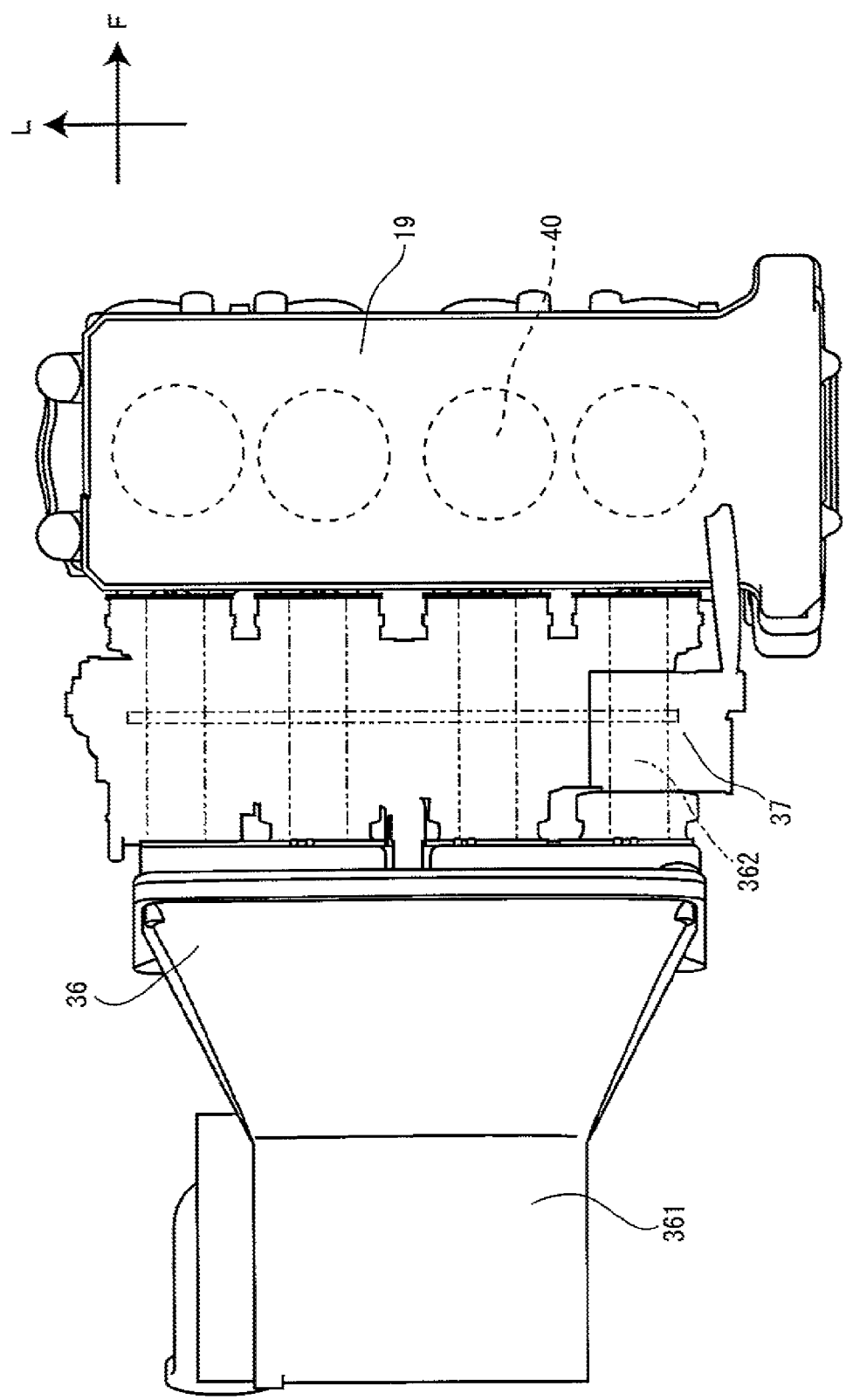
FIG. 3 is a partial enlarged plan view of the engine and intake device.

FIG. 3 is a plan view of the exterior of the engine 19 and intake device 36. In FIG. 3, only part of the intake device 36 is shown in its external appearance and its details are not shown. The engine 19 includes four cylinders 40. The four cylinders 40 are arranged side-by-side in a left-to-right direction. The intake device 36 is connected with the engine 19. The intake device 36 is located rearward of the cylinders 40. The intake device 36 supplies the combustion chamber of the engine 19 with air. The intake device 36 includes an air cleaner 361, four intake passages 362, and a throttle assembly 37. The air cleaner 361 supplies the intake passages 362 with air. The four intake passages 362 are located between the combustion chamber of the engine 19 and the air cleaner 361. The four intake passages 362 are arranged side-by-side in a left-to-right direction. The throttle assembly 37 is located on the four intake passages 362. The right end of the engine 19 is located to the right of the rightmost point of the throttle assembly 37.

Figure 4:
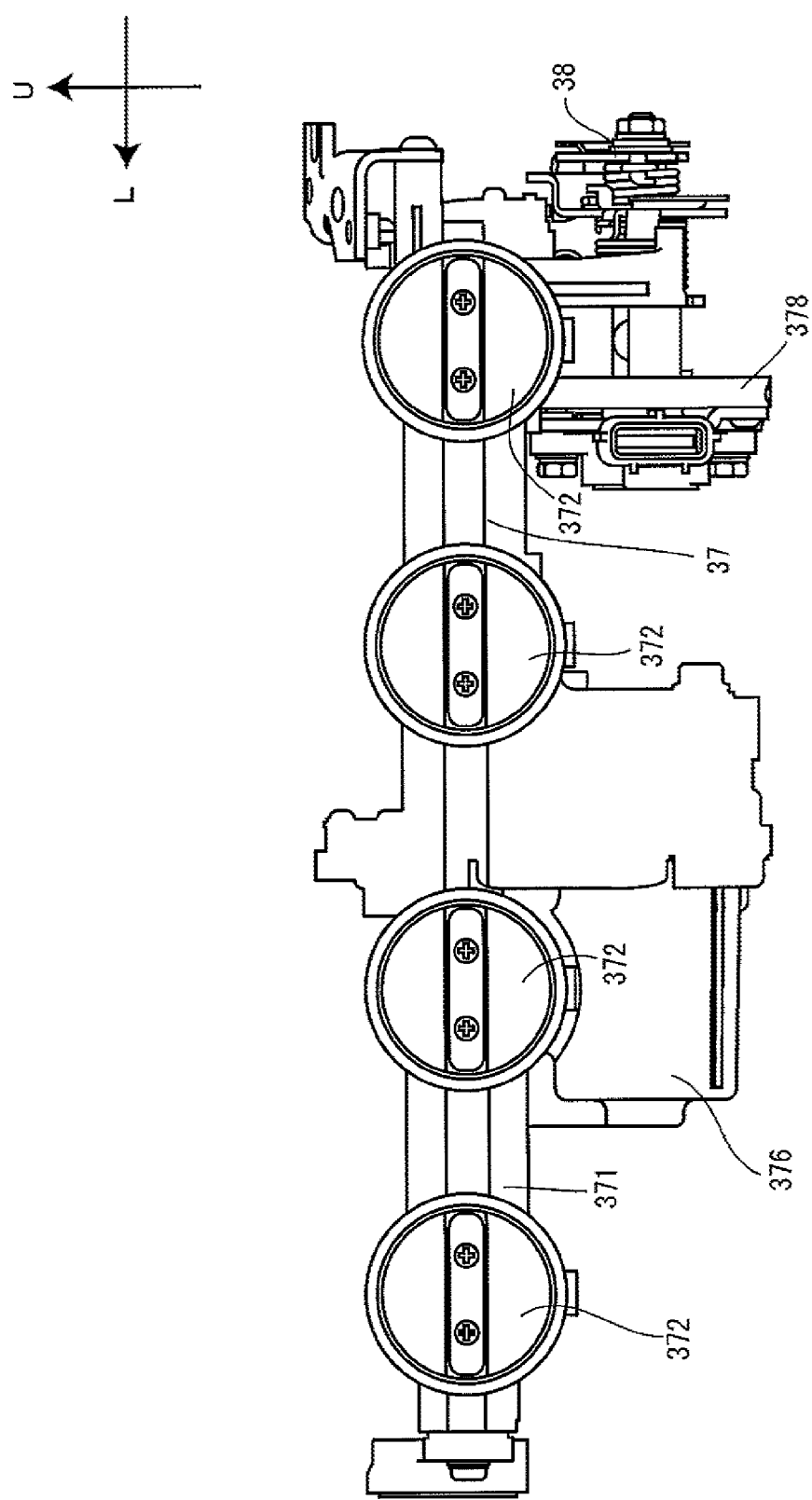
FIG. 4 is a rear view of a throttle assembly.

FIG. 4 is a partial enlarged view of the throttle assembly 37 and its surrounding components. FIG. 4 shows the throttle assembly 37 as viewed from the side thereof close to the air cleaner 361 shown in FIG. 3. For ease of explanation, the engine 19 and some other components are not shown in FIG. 4.

The throttle assembly 37 includes a throttle body 371 and throttle valves 372. The throttle body 371 extends in a left-to-right direction. Four throttle valves 372 are arranged side-by-side in a left-to-right direction on the throttle body 371. A frame 378 is fixed to the throttle body 371. The frame 378 extends in a top-to-bottom direction. The frame 378 supports the opening control mechanism 38. The opening control mechanism 38 provides a signal to an engine control unit (ECU), not shown, in response to operation of the grip 30 by the rider. Upon receiving a signal from the opening control mechanism 38, the ECU provides a signal to a motor 376 to regulate the degree of opening of the throttles. The opening control mechanism 38 is supported by a lower portion of the frame 378. The opening control mechanism 38 is located to the right of the throttle assembly 37.

Figure 5:
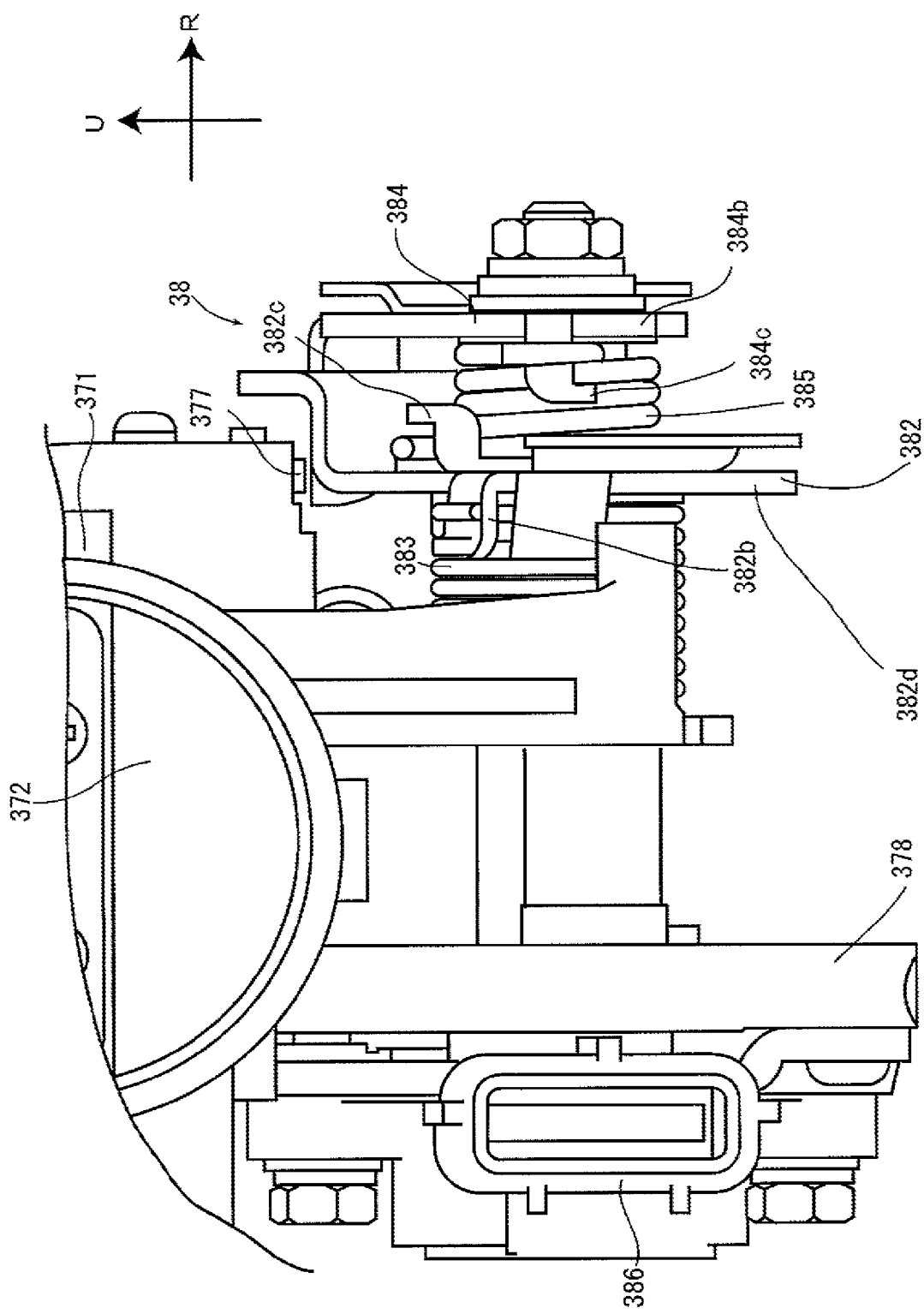
FIG. 5 is a rear view of the opening control mechanism.

FIG. 5 is an enlarged rear view of the opening control mechanism 38. The opening control mechanism 38 includes a first pulley 382, a first coil spring 383, a second pulley 384, a second coil spring 385 and an accelerator position sensor 386.

The first pulley 382 is located to the right of the frame 378. The first pulley 382 includes a first pulley body 382d, a first hook 382b and a second hook 382c. The first pulley body 382d is rotatable around an axis extending in a vehicle width direction. The first pulley body 382d is shaped like a plate. The first hook 382b extends in a left-to-right direction. The first hook 382b extends to the left from the first pulley body 382d. The second hook 382c extends in a left-to-right direction. The second hook 382c extends to the right from the first pulley body 382d. A cancel switch 377 is located above the first pulley body 382d. The cancel switch 377 provides a signal to the ECU. Upon receiving a signal from the cancel switch 377, the ECU switches the vehicle from auto-cruise mode to normal mode. If the auto-cruise switch 35 is depressed and then the cancel switch 377 is pressed, the motorcycle 10 switches from auto-cruise mode to normal mode.

The first coil spring 383 is located between the first pulley 382 and the frame 378. One end of the coil spring 383 is fixed to the frame 378. The other end of the first coil spring 383 is attached to the first pulley 382. The other end of the first coil spring 383 is in contact with the first hook 382b.

The second pulley 384 is located to the right of the first pulley 382. The second pulley 384 includes a second pulley body 384b and a third hook 384c. The second pulley body 384b is rotatable around an axis extending in a vehicle width direction. The second pulley body 384b is shaped like a plate. The third hook 384c extends to the left from the second pulley body 384b.

The second coil spring 385 is located between the first pulley 382 and second pulley 384. One end of the second coil spring 385 is in contact with the second hook 382c. The other end of the second coil spring 385 is in contact with the third hook 384c. The accelerator position sensor 386 is located to the left of the frame 378.

Figure 6:
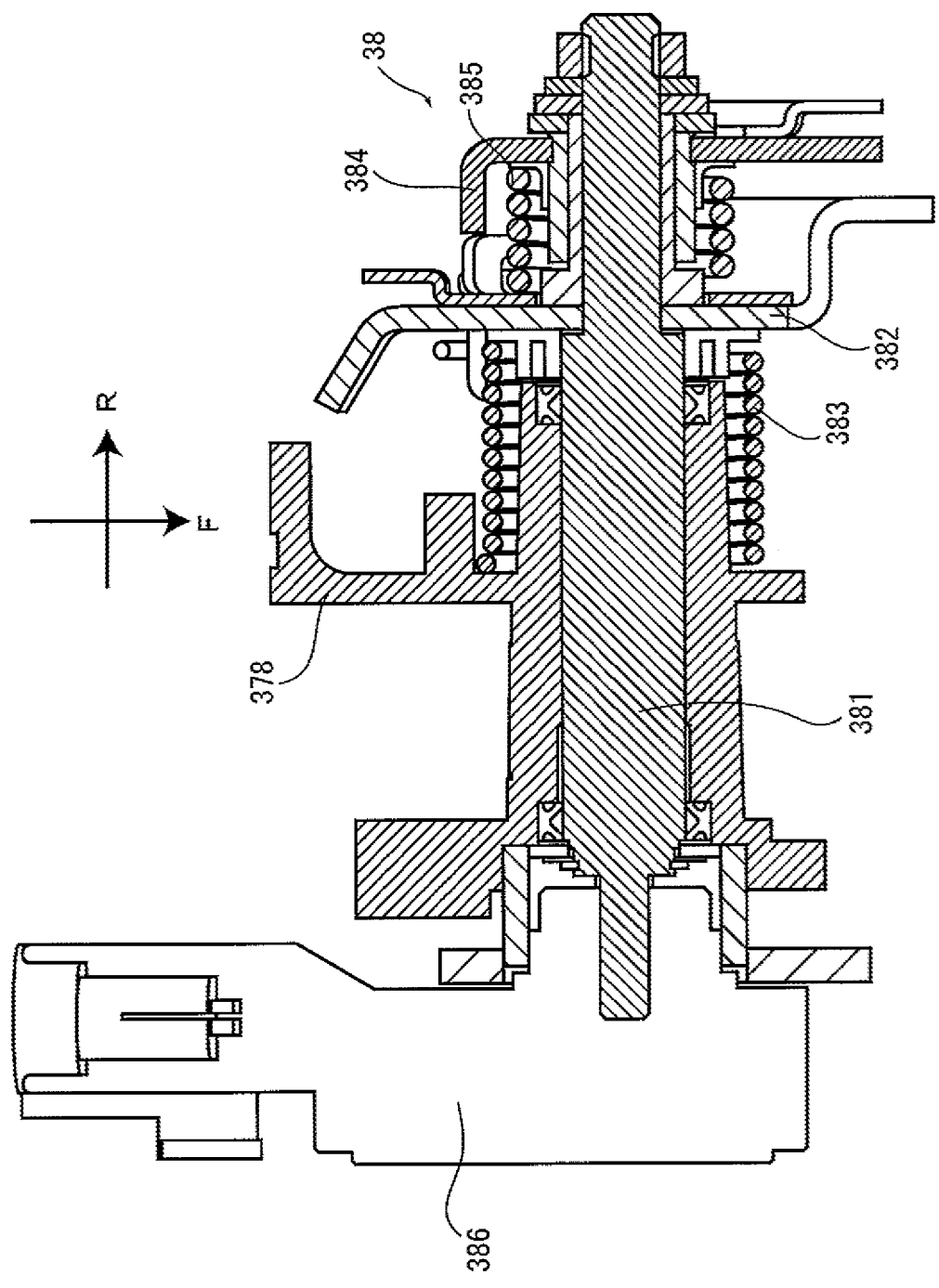
FIG. 6 is a cross-sectional view of the opening control mechanism.

FIG. 6 is an enlarged cross-sectional view of the opening control mechanism 38. The opening control mechanism 38 includes a support shaft 381. The support shaft 381 extends in a vehicle width direction. The support shaft 381 extends in a left-to-right direction. The support shaft 381 is supported rotatably relative to the frame 378. The accelerator position sensor 386 is located on one end of the support shaft 381. The accelerator position sensor 386 measures the amount of rotation of the support shaft 381. The first coil spring 383 and second coil spring 385 are located around the support shaft 381.

The first pulley 382 is supported by the support shaft 381. The first pulley 382 is non-rotatable relative to the support shaft 381.

The second pulley 384 is supported by the support shaft 381. The second pulley 384 is rotatable relative to the support shaft 381.

The accelerator position sensor 386 measures the amount of rotation of the support shaft 381. The accelerator position sensor 386 extends in a front-to-rear direction.

Figure 7:
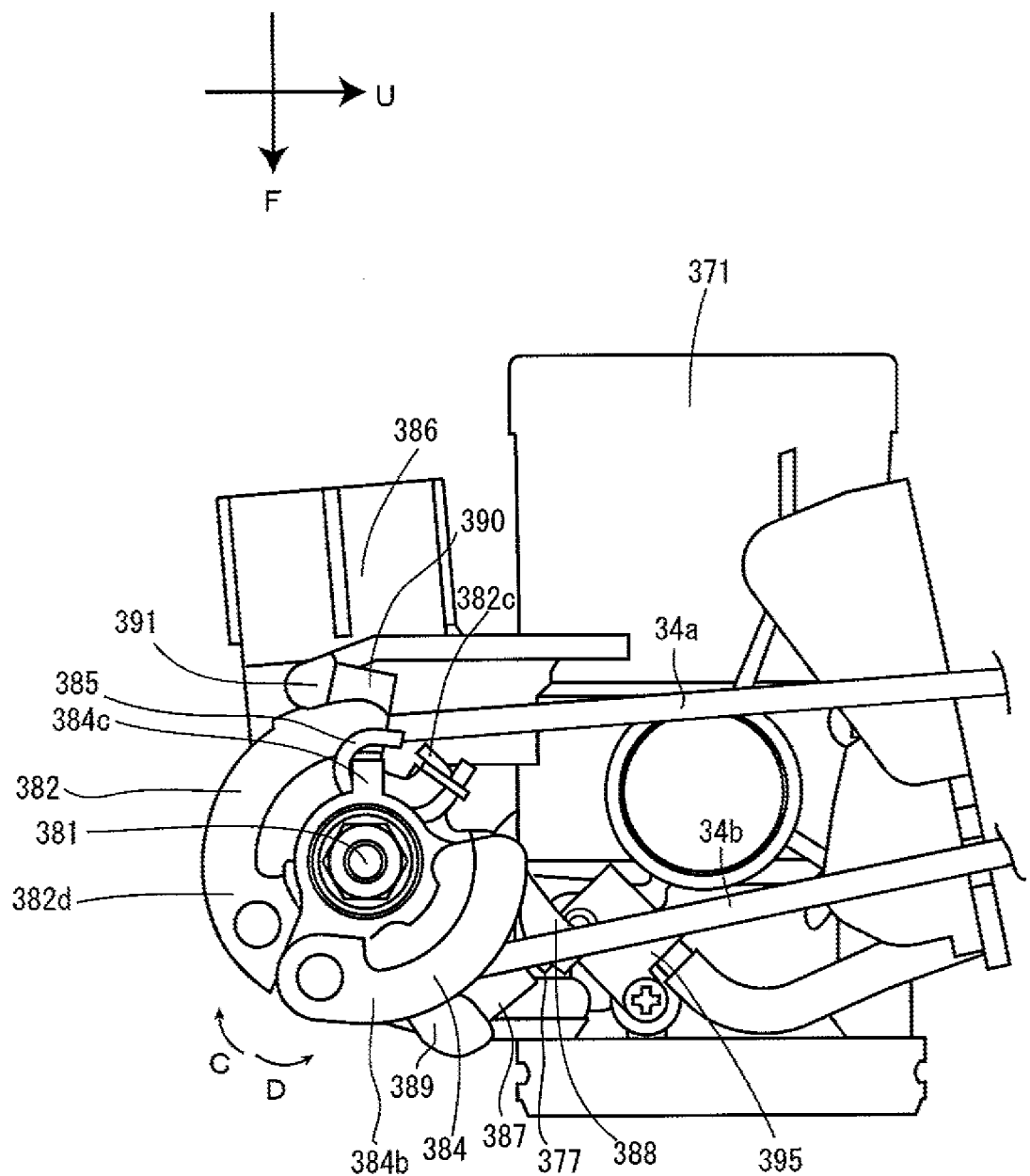
FIG. 7 is a side view of the opening control mechanism where no force is applied to the grip.

FIG. 7 is a side view of the opening control mechanism 38 as viewed from the right. FIG. 7 shows the opening control mechanism 38 as where the grip 30 is positioned at the free position, or in other words, no operating force acts on the grip 30. The position of the support shaft 381 where the first pulley 382 is positioned as shown in FIG. 7 will be referred to as first reference position. The position of the second pulley 384 relative to the first pulley 382 as shown in FIG. 7 will be referred to as second reference position. The second reference position is a position of the second pulley 384 relative to the first pulley 382. In FIG. 7, the motor 376 and some other components are not shown.

In the right side view, the support shaft 381 can be rotated in the direction of arrow C in FIG. 7 (corresponding to the first direction of rotation of the present application), starting from the first reference position. Rotating the grip 30 toward the rear causes rotation of the first pulley 382, which causes the support shaft 381 to rotate in the direction of arrow C. As the support shaft 381 is rotated in the direction of arrow C, the degree of opening of the throttles increases. Rotating the grip 30 toward the front causes the support shaft 381 to rotate in the direction of arrow D in FIG. 7 (corresponding to the second direction of rotation of the present invention). The first pulley body 382d includes a fan-shaped plate with its center at the support shaft 381. A first throttle cable 34a is attached to the first pulley 382. The first throttle cable 34a extends from the throttle cable 34 attached to the drive pulley 33. As the first pulley 382 is rotated, the support shaft 381 is rotated. The second pulley body 384b includes a fan-shaped plate with its center at the support shaft 381. A second throttle cable 34b is attached to the second pulley 384. The second throttle cable 34b extends from the throttle cable 34 attached to the drive pulley 33. The second pulley 384 includes a switch actuator lever 387. When the first pulley 382 is positioned at the first reference position, rotation of the second pulley 384 starting from the second reference position in the direction of arrow D in the right side view causes the switch actuator lever 387 to press the cancel switch 377. The first pulley 382 includes a first stopper 388 and a second stopper 390. The first stopper 388 is located at a position forward in the direction of arrow D relative to the switch actuator lever 387. When the switch actuator lever 387 presses the cancel switch 377, the first stopper 388 stops the switch actuator lever 387 to prevent the switch actuator lever 387 from further advancing in the direction of arrow D. The second stopper 390 is located on the periphery of the first pulley 382. When the switch actuator lever 387 presses the cancel switch 377, the second stopper 390 gets in contact with the support 391. The support 391 is provided on the frame 378. The first pulley 382 includes a contact 389. The contact 389 is in contact with the switch actuator lever 387 when the grip 30 is not operated. The contact 389 is located at a position forward in the direction of arrow C relative to the switch actuator lever 387.

When the grip 30 is rotated toward the rear starting from the free position, the first pulley 382 is rotated in the direction of arrow C. At this time, the second pulley 384 receives a force from the second coil spring 385 to rotate in the direction of arrow C. Thus, with the switch actuator lever 387 being in contact with the contact 389, the first pulley 382 and second pulley 384 are rotated in the direction of arrow C. Thereafter, when the grip 30 is rotated toward the front to the free position, the contact 389 applies a force to the switch actuator lever 387 in the direction of arrow D. At this time, with the switch actuator lever 387 being in contact with the contact 389, the first pulley 382 and second pulley 384 are rotated in the direction of arrow D.

When the grip 30 is rotated toward the front starting from the free position, the first pulley 382 remains at the first reference position and only the second pulley 384 is rotated in the direction of arrow D. At this time, the switch actuator lever 387 comes off the contact 389 and moves toward the first stopper 388. Thereafter, when the force applied to the grip 30 is removed, the second coil spring 385 causes the second pulley 384 to rotate in the direction of arrow C. At this time, the first pulley 382 remains at the first reference position. Rotation of the second pulley 384 in the direction of arrow C causes the switch actuator lever 387 to move toward the contact 389. The grip 30 moves to the free position.

The second reference position is the position taken by the second pulley 384 relative to the first pulley 382 when the contact 389 is in contact with the switch actuator lever 387. The second reference position is the position taken by the second pulley when no operating force acts on the grip 30.

Figure 8:
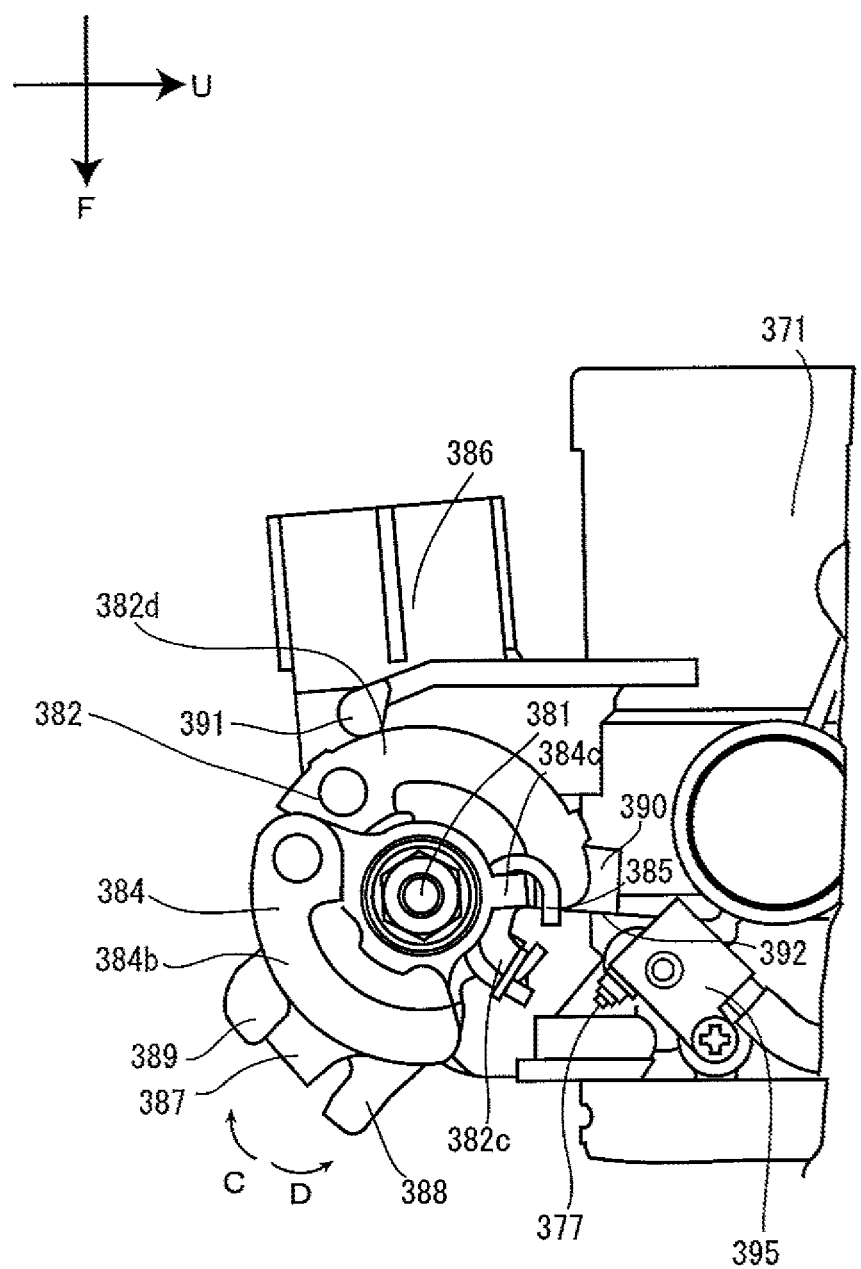
FIG. 8 is a side view of the opening control mechanism where the throttle is fully opened.

FIG. 8 shows the first pulley 382 and second pulley 384 as rotated in the direction of arrow C starting from their positions as shown in FIG. 7. In other words, FIG. 8 shows the opening control mechanism 38 as it appears during full throttle. For ease of explanation, the first throttle cable 34a and second throttle cable 34b are not shown in FIG. 8.

When the rider rotates the grip 30 toward the rear starting from the free position, i.e. in the direction of arrow A in FIG. 2, the support shaft 381 is rotated in the direction of arrow C, starting from the first reference position, in the right side view. At this time, the first pulley 382 is rotated in the direction of arrow C together with the support shaft 381. With the first pulley 382 rotated in the direction of arrow C, the first coil spring 383 causes an elastic force in the direction of arrow D to act on the first pulley 382. An elastic force from the second coil spring 385 causes the second pulley 384 to rotate in the direction of arrow C. When the grip 30 is fully rotated toward the rear, the second stopper 390 of the first pulley 382 gets in contact with a third stopper 392. The accelerator position sensor 386 detects rotation of the support shaft 381 and, based on the rotation of the support shaft 381, it is determined if the grip 30 has been fully rotated to the rear. When the accelerator position sensor 386 detects rotation of the support shaft 381, the ECU controls the motor 376 to open the throttle valves 372. With the pulleys being positioned as shown in FIG. 8, when the grip 30 is returned to the free position, an elastic force of the first coil spring 383 causes the first pulley 382 to rotate in the direction of arrow D. At this time, the rotation of the first pulley 382 causes the support shaft 381 to rotate to the first reference position. At the same time, the contact 389 causes the second pulley 384 to rotate in the direction of arrow D.

Figure 9:
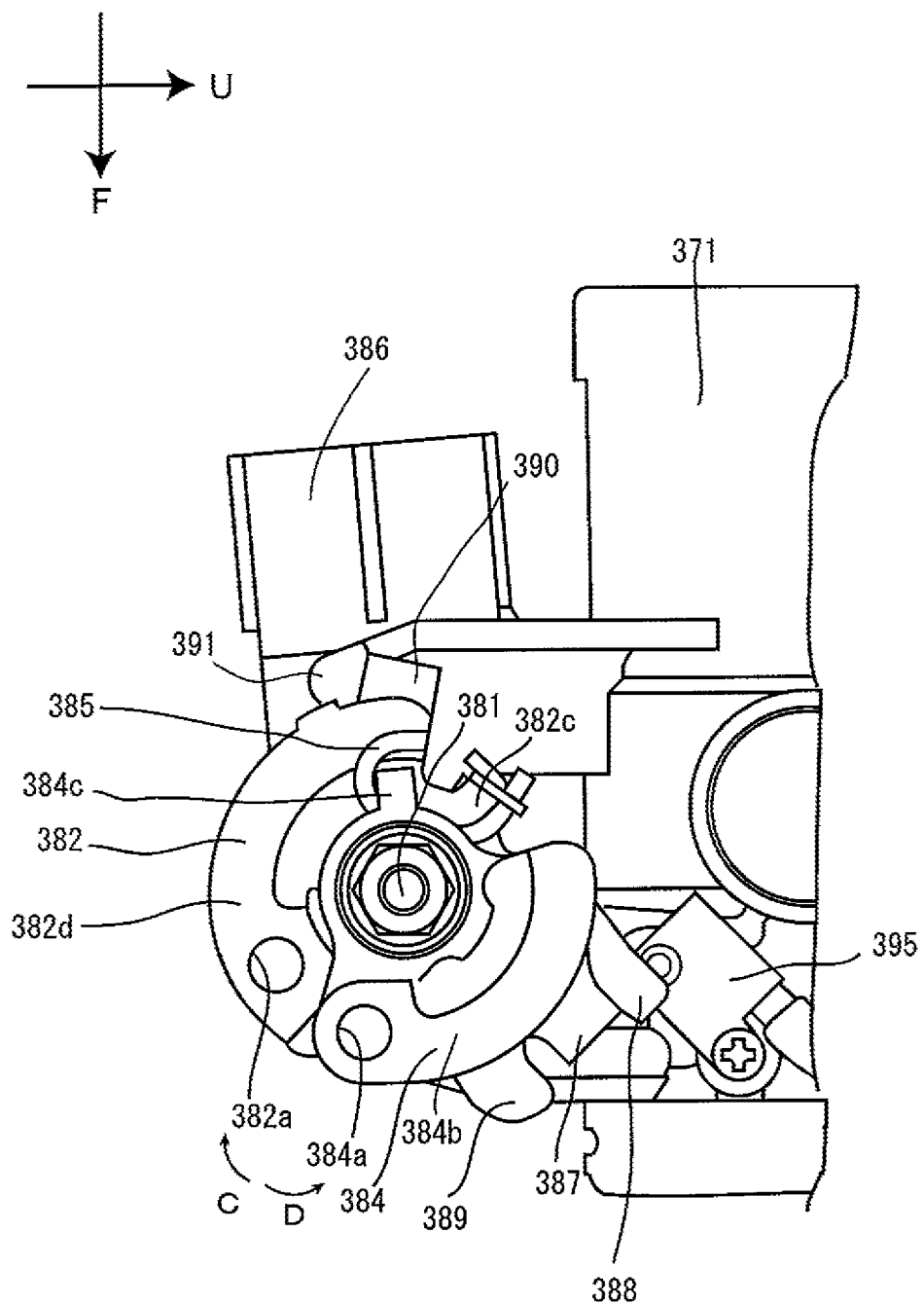
FIG. 9 is a side view of the opening control mechanism where the switch is pressed.

FIG. 9 shows the pulleys as they appear when, starting from their positions shown in FIG. 7, the grip 30 has been rotated toward the front starting from the free position, i.e. the grip 30 has been rotated in the direction of arrow B of FIG. 2. For ease of explanation, the first throttle cable 34a and second throttle cable 34b are not shown in FIG. 9. When the rider rotates the grip 30 toward the front starting from the free position, the second pulley 384 is rotated in the direction of arrow D, starting from the second reference position, in the right side view. With the second pulley 384 rotated in the direction of arrow D in the right side view starting from the second reference position, the second coil spring 385 causes an elastic force in the direction of arrow C to act on the second pulley 384. At this time, the support shaft 381 maintains the first reference position and is not rotated. The first pulley 382 is not rotated since the second stopper 390 is prevented by the support 391 from rotating in the direction of arrow D. When the second pulley 384 is rotated in the direction of arrow D starting from the second reference position, the switch actuator lever 387 presses the cancel switch 377. When the cancel switch 377 is pressed, the ECU cancels the auto-cruise mode.

<Advantages of the Present Embodiment>

In the motorcycle 10 according to the above embodiment, the rider may rotate the grip 30 toward the rear to accelerate the vehicle. In the motorcycle 10, in auto-cruise mode, the grip 30 may be rotated toward the front to cancel the auto-cruise mode. Thus, the auto-cruise mode may be cancelled with a simple operation.

In the motorcycle 10 above, a first throttle cable 34a and second throttle cable 34b are attached to the first pulley 382 and second pulley 384, respectively. The pulley that is rotated to accelerate the motorcycle 10 and the pulley for cancelling the auto-cruise mode are separate members. Thus, the range of rotational movement of each pulley is smaller than in an arrangement with one pulley. For example, in an arrangement with one large pulley, the pulley has a large diameter such that one end of a throttle cable is attached to a location that is far from that of the other end of the cable. Thus, in such an arrangement, the space for the pulley has a large dimension in a radial direction of the pulley and the space for the throttle cable also has large dimensions. This results in a large device as a whole in such an arrangement. In the motorcycle 10, a first pulley 382 and second pulley 384 are used such that the diameter of each pulley does not have to be large, removing the necessity for a large space for the throttle cable. As such, the motorcycle 10 only requires a device that is smaller as a whole than an arrangement with one pulley with a large diameter.

In the motorcycle 10 above, the auto-cruise mode may be cancelled by rotating the second pulley 384 to press the cancel switch 377. At this time, the switch actuator lever 387 gets in contact with the first stopper 388. This prevents the switch actuator lever 387 from being further rotated in the direction of arrow D in FIG. 7 in the right side view after the lever presses the cancel switch 377.

In the motorcycle 10 above, the second stopper 390 gets in contact with the support 391 when the switch actuator lever 387 presses the cancel switch 377. This prevents the first pulley 382 from being further rotated in the direction of arrow D in the right side view, past their positions as in FIG. 9. The support shaft 381 is prevented from being rotated in the direction of arrow D in the right side view from its position taken when no force is applied to grip 30.

In the motorcycle 10, all components of the opening control mechanism 38 are located inward of the outermost point of the engine 19 in a vehicle width direction. This results in a smaller device than in an implementation where at least part of the opening control mechanism 38 is located outward of the outermost point of the engine 19 in a vehicle width direction.

[Other Embodiments]

(1) While the above embodiment has illustrated a motorcycle 10, the present invention is not limited to such an implementation and may be used in a three- or four-wheeled straddle type vehicle or the like.

(2) While the above embodiment employs an arrangement that causes the auto-cruise mode to be canceled when the cancel switch 377 is pressed, the present invention is not limited to such an implementation. A sensor similar to the accelerator position sensor 386 may be attached to the right end of the support shaft 381 to measure the angle of rotation of the second pulley 384 and, when the sensor detects that the second pulley 384 has been rotated counter-clockwise in the left side view by a predetermined amount, the ECU may cancel the auto-cruise mode. In such an implementation, no cancel switch 377 is required.

(3) While in the above embodiment, the opening control mechanism 38 is supported by a frame 378 fixed to the throttle body 371, the present invention is not limited to such an implementation. Instead, the mechanism may be supported by the body frame or other components.

(4) While the above embodiment has illustrated an arrangement for cancelling the auto-cruise mode, the present invention is not limited to such an implementation. A specified operation may be performed in response to operation of the grip 30. For example, the grip 30 may be rotated, starting from the free position, in a direction that causes the degree of opening of the throttles to decrease to perform downshifting. In such an implementation, it is detected that the grip 30 has been rotated, starting from the free position, in a direction that causes the degree of opening of the throttles to decrease, and a shift-change instruction for downshifting is then issued.

(5) While the above embodiment has illustrated a four-cylinder engine, the present invention is not limited to such an implementation. The present invention may be used with a single-cylinder or multicylinder, other than four-cylinder, engine. Alternatively, the present invention may be used with a V engine, for example.

(6) While the above embodiment has illustrated an arrangement with an electrically controlled throttle assembly, the present invention is not limited to such an implementation.

The present invention may be used with a throttle assembly in which the throttle valves can be directly driven by throttle wires.

What is claimed is:

1. A straddle type vehicle, comprising:
   a handlebar;
   a grip attached to the handlebar;
   an engine;
   an intake passage connected with the engine;
   a throttle body, including a throttle valve, provided on the intake passage;
   a drive pulley configured to be rotated as the grip is rotated;
   a first throttle cable and a second throttle cable located between the drive pulley and the throttle valve;
   a processing unit configured to perform a specified operation or issue an instruction in response to an operation of the grip; and
   an opening control mechanism configured to control a degree of opening of the throttle valve, wherein the opening control mechanism includes:
      a frame;
      a support shaft supported by the frame and rotatable in a first direction of rotation starting from a first reference position;
      a first pulley attached to the support shaft, the first pulley being non-rotatable relative to the support shaft, and the first throttle cable being connected with the first pulley;
      a second pulley attached to the support shaft, the second throttle cable being connected with the second pulley, the second pulley being rotatable relative to the first pulley; and
      a first elastic member located between the frame and the first pulley,
   wherein when the grip is rotated in an opening direction that causes the degree of opening of the throttle valve to increase,
      a force is transmitted from the first throttle cable to the first pulley such that the first pulley is rotated in the first direction of rotation to move the support shaft from the first reference position in the first direction of rotation,
      the processing unit issues the instruction, which opens the throttle valve, as the support shaft is rotated in the first direction of rotation from the first reference position, and
      with the support shaft being positioned at a position forward in the first direction of rotation relative to the first reference position, the first elastic member causes a force in a second direction of rotation, which is opposite the first direction of rotation, to act on the first pulley,
   further wherein a position taken by the second pulley, when no force acts on the grip, is referred to as a second reference position, and the second pulley is rotatable in the second direction of rotation starting from the second reference position, and
   further wherein when the grip is rotated in a closing direction that causes the degree of opening of the throttle valve to decrease,
      a force is transmitted from the second throttle cable to the second pulley such that the second pulley is rotated in the second direction of rotation, and
      the processing unit performs the specified operation when the second pulley has been rotated by a predetermined amount in the second direction of rotation starting from the second reference position.

2. The straddle type vehicle according to claim 1, further comprising:
   a switching unit configured to cause the vehicle to be switched from normal mode to auto-cruise mode,
   wherein the processing unit performs the specified operation
      after the switching unit causes the vehicle to be switched from the normal mode to the auto-cruise mode so that the vehicle is in the auto-cruise mode, and
      the second pulley is rotated, starting from the second reference position,
   in the second direction of rotation by the predetermined amount,
   further wherein the specified operation is to cancel the auto-cruise mode and switch the vehicle to the normal mode.

3. The straddle type vehicle according to claim 1, wherein:
   the opening control mechanism further includes a second elastic member located between the first pulley and the second pulley; and
   the second elastic member is configured to cause a force in the first direction of rotation to act on the second pulley when the second pulley is positioned at a position forward in the second direction of rotation relative to the second reference position.

4. The straddle type vehicle according to claim 2, wherein:
   the processing unit includes a switch;
   the second pulley includes a switch actuator member;
   the switch is located at a position where it is pressed by the switch actuator member when the second pulley has been rotated in the second direction of rotation, starting from the second reference position, by the predetermined amount, with the first pulley being positioned at the first reference position; and
   the processing unit performs the specified operation when the switch is pressed and the vehicle is in the auto-cruise mode.

5. The straddle type vehicle according to claim 4, wherein:
   the first pulley includes a first stopper;
   the first stopper is spaced apart from the switch actuator member at a predetermined distance in the second direction of rotation when the support shaft is positioned at the first reference position and the second pulley is positioned at the second reference position; and
   the switch actuator member presses the switch and contacts the first stopper after the second pulley has been rotated in the second direction of rotation, starting from the second reference position, by the predetermined amount.

6. The straddle type vehicle according to claim 5, wherein:
   the second reference position also corresponds to a position of the second pulley relative to the first pulley when no force acts on the grip;
   the first pulley includes a pulley contact; and
   the pulley contact contacts the switch actuator member and is positioned at a position forward in the first direction of rotation relative to the switch actuator member when the first pulley is positioned at the first reference position and the second pulley is positioned at the second reference position.

7. The straddle type vehicle according to claim 4, wherein the switch is supported by the frame.

8. The straddle type vehicle according to claim 2, further comprising:
   a rotational angle measurement sensor configured to measure an angle of rotation of the second pulley; and the processing unit cancels the auto-cruise mode when the rotational angle measurement sensor determines that the second pulley has been rotated in the second direction of rotation, starting from the second reference position, by the predetermined amount.

9. The straddle type vehicle according to claim 8, wherein the rotational angle measurement sensor is further configured to measure an angle of rotation of the support shaft, and based on the measured rotation of the support shaft the processing unit determines whether to issue the instruction.

10. The straddle type vehicle according to claim 8, wherein the rotational angle measurement sensor is located at one end of the support shaft.

11. The straddle type vehicle according to claim 1, wherein:
- the first pulley includes a second stopper extending outwardly from a periphery thereof;
- the frame includes a third stopper; and
- the second stopper contacts the third stopper when the first pulley has been rotated in the first direction of rotation, starting from the first reference position, by a predetermined amount.

12. The straddle type vehicle according to claim 11, further comprising:
- a support, wherein the second stopper is in contact with the support, that is located in the second direction of rotation relative to the second stopper, when the first pulley is located at the first reference position.

13. The straddle type vehicle according to claim 1, wherein:
- the first pulley is located closer to the frame in the first direction than in the second direction; and
- the second pulley is located closer to the first pulley in the first direction than in the second direction.

14. The straddle type vehicle according to claim 13, wherein:
- the engine includes a plurality of cylinders;
- the cylinders are arranged in a vehicle width direction of the vehicle;
- the throttle body is located rearward of the engine; and
- both ends of the engine in the vehicle width direction are further outward in the vehicle width direction than both ends of the second pulley that are in the vehicle width direction.

* * * * *